Patented May 6, 1930

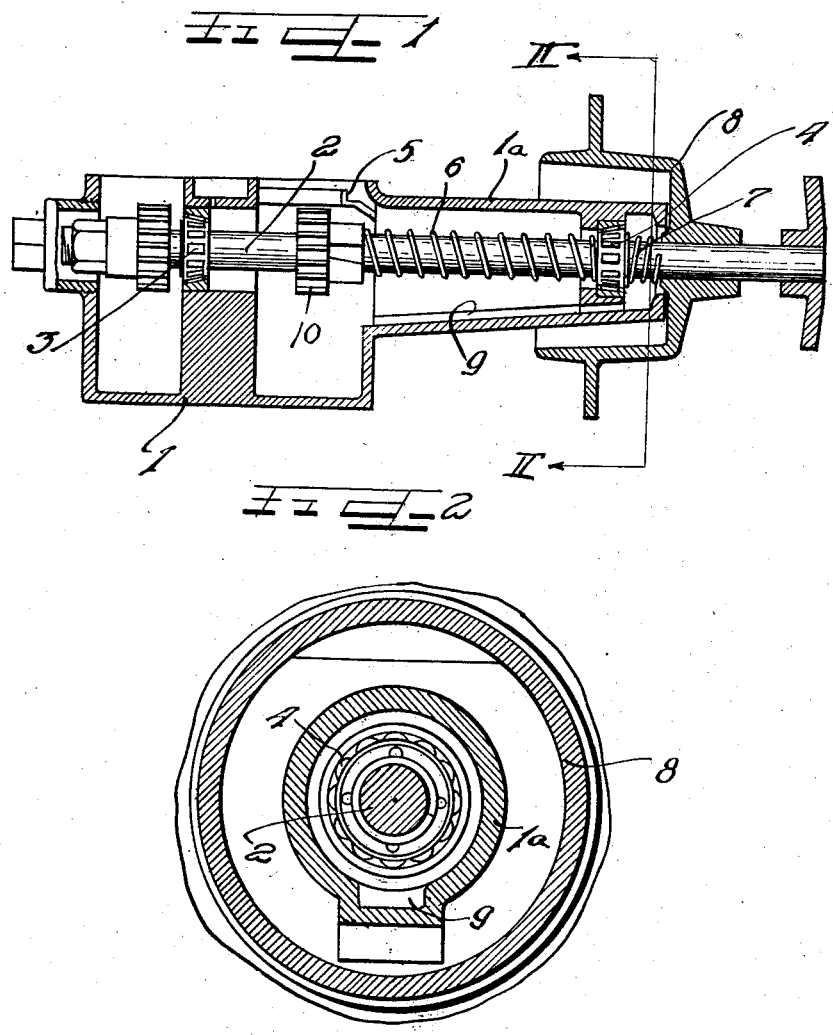

1,757,642

UNITED STATES PATENT OFFICE

JOHN AUGUST LUND, OF BATAVIA, ILLINOIS, ASSIGNOR TO CHALLENGE COMPANY, A CORPORATION OF ILLINOIS

OILING MECHANISM

Application filed February 17, 1927. Serial No. 168,934.

This invention relates to lubrication and concerns itself with means for conveying the lubricant to the point or part desiring lubrication in combination with means for returning lubricant that may pass beyond the part to be lubricated.

The invention comprises the novel structure and combination of parts hereinafter described and more particularly pointed out and defined in the appended claim.

In the accompanying drawings which illustrate a preferred embodiment of this invention and in which similar reference numerals refer to similar features in the different views:

Figure 1 is a longitudinal sectional view through a shaft bearing embodying this invention.

Figure 2 is an enlarged sectional view taken upon the line II—II of Figure 1.

As shown on the drawings:

As illustrative of this invention there is shown a casing 1 in which a shaft 2 is journaled by means of roller bearings 3 and 4. It will be noted that the roller bearing 4 is located in a lateral extension 1ª of the casing. It might be mentioned that the illustrated apparatus is a portion of a windmill structure and that the operating parts, including gear 10, of the windmill are adapted for elevating the lubricant which may originally be put in the bottom of the casing 1 to a runway 5 from which it is adapted to travel and drop upon that portion of the shaft 5 which is located within the extension 1ª. A coil spring 6 surrounds the shaft 2 in the extension 1ª and extends from a point rearwardly of the mouth of the runway to a point closely adjacent the roller bearing 4. The coil spring is secured for rotation with the shaft 2 and the spirals act as a conveyor for conveying the oil from the runway 5 to the bearing 4.

As the lubricant is conveyed to the right by the spiral spring 6, some of it will obviously pass beyond the ball bearing 4 and eventually escape from the casing and be lost. Consequently, in time the casing will become exhausted with respect to lubricant. In order to overcome this objection a second spiral spring 7 is placed upon the shaft 2 upon the right hand side of the ball bearing 4, for rotation with said shaft. It will be noted that this spring 7 extends between the bearing 4 and the end of the hub 8 of the windwheel for the windmill. It should also be noted that the spirals of the spring 7 are reversely arranged with respect to the spirals of the spring 6. Consequently, the action of the spring 7 will convey the lubricant to the left against the action of the spring 6. This not only results in more effective lubrication for the bearing, but it also prevents the lubricant from escaping from the casing. Any excess lubricant will merely drop from the shaft 2 and collect in a return runway 9 at the bottom of the extension 1ª. From this runway the lubricant may return to the casing 1.

From the foregoing it will be appreciated that a very effective system of lubrication has been provided which conserves the lubricant and prevents the same from escape with respect to its bearings.

I am aware that many changes may be made and numerous details of construction may be varied through a wide range without departing from the principles of this invention and I, therefore, do not purpose limiting the patent granted hereon otherwise than necessitated by the prior art.

I claim as my invention:

In an oiling mechanism for windmills, a casing having an oil chamber in the bottom thereof, a bearing housed in the casing, a shaft journaled in and extending through the bearing, a runway in the casing and positioned above the shaft, toothed gear means to elevate oil from the oil chamber to the said runway, a coil spring on the shaft adapted to receive oil dropped from the said runway and to carry it to the said bearing, and a coil spring of reversed pitch on the shaft and on the other side of the bearing adapted to return oil to the said chamber.

In testimony whereof I have hereunto subscribed my name.

JOHN AUGUST LUND.